United States Patent
Janssen et al.

[11] Patent Number: 5,961,383
[45] Date of Patent: Oct. 5, 1999

[54] METHOD AND DEVICE FOR BONING A LEG

[75] Inventors: Petrus Christianus H. Janssen, Wilbertoord; Adrianus J. van den Nieuwelaar, Gemert, both of Netherlands

[73] Assignee: Stork PMT B.V., Netherlands

[21] Appl. No.: 08/713,990

[22] Filed: Sep. 13, 1996

[30] Foreign Application Priority Data

Sep. 18, 1995 [NL] Netherlands ............................ 1001226

[51] Int. Cl.⁶ ........................................... A22C 17/04
[52] U.S. Cl. ................................. 452/135; 452/136
[58] Field of Search .............................. 452/136, 135

[56] References Cited

U.S. PATENT DOCUMENTS

| | | |
|---|---|---|
| 3,457,586 | 7/1969 | Zwief et al. . |
| 3,644,963 | 2/1972 | Terranova . |
| 4,380,849 | 4/1983 | Adkison et al. . |
| 5,067,927 | 11/1991 | Hazenbroek et al. .......... 452/135 |
| 5,108,344 | 4/1992 | Debey ............................ 452/135 |
| 5,176,562 | 1/1993 | Martin et al. .................. 452/136 |
| 5,178,580 | 1/1993 | Sekiguchi ...................... 452/135 |
| 5,401,210 | 3/1995 | Manmoto et al. .............. 452/136 |
| 5,462,477 | 10/1995 | Ketels ............................ 452/135 |
| 5,542,879 | 8/1996 | Kunig et al. ................... 452/135 |

FOREIGN PATENT DOCUMENTS

| | | |
|---|---|---|
| 0 427 707 A2 | 5/1991 | European Pat. Off. . |
| 0 439 780 A1 | 8/1991 | European Pat. Off. . |
| 0 442 554 A1 | 8/1991 | European Pat. Off. . |
| 0 590 733 A1 | 4/1994 | European Pat. Off. . |
| 0 594 934 | 5/1994 | European Pat. Off. . |
| 43 20 241 A1 | 12/1994 | Germany . |
| 7317152 | 3/1974 | Netherlands . |
| 9301238 | 2/1994 | Netherlands . |

*Primary Examiner*—Willis Little
*Attorney, Agent, or Firm*—John S. Pratt; Kilpatrick Stockton LLP

[57] ABSTRACT

A method and a device for boning a leg or a part thereof of a slaughtered animal. Prior to the removal of the meat from the leg or the part thereof, an incision is made through a tendon at the position of the condyle of the tibia in the ankle joint. During scraping of meat from the lower leg, the lower leg is retained by a lug which engages in the canalis tendineus. Prior to or during the boning operation, the kneecap of the leg is pressed through an opening of a stop element, following which the kneecap projecting from the opening is removed.

20 Claims, 3 Drawing Sheets

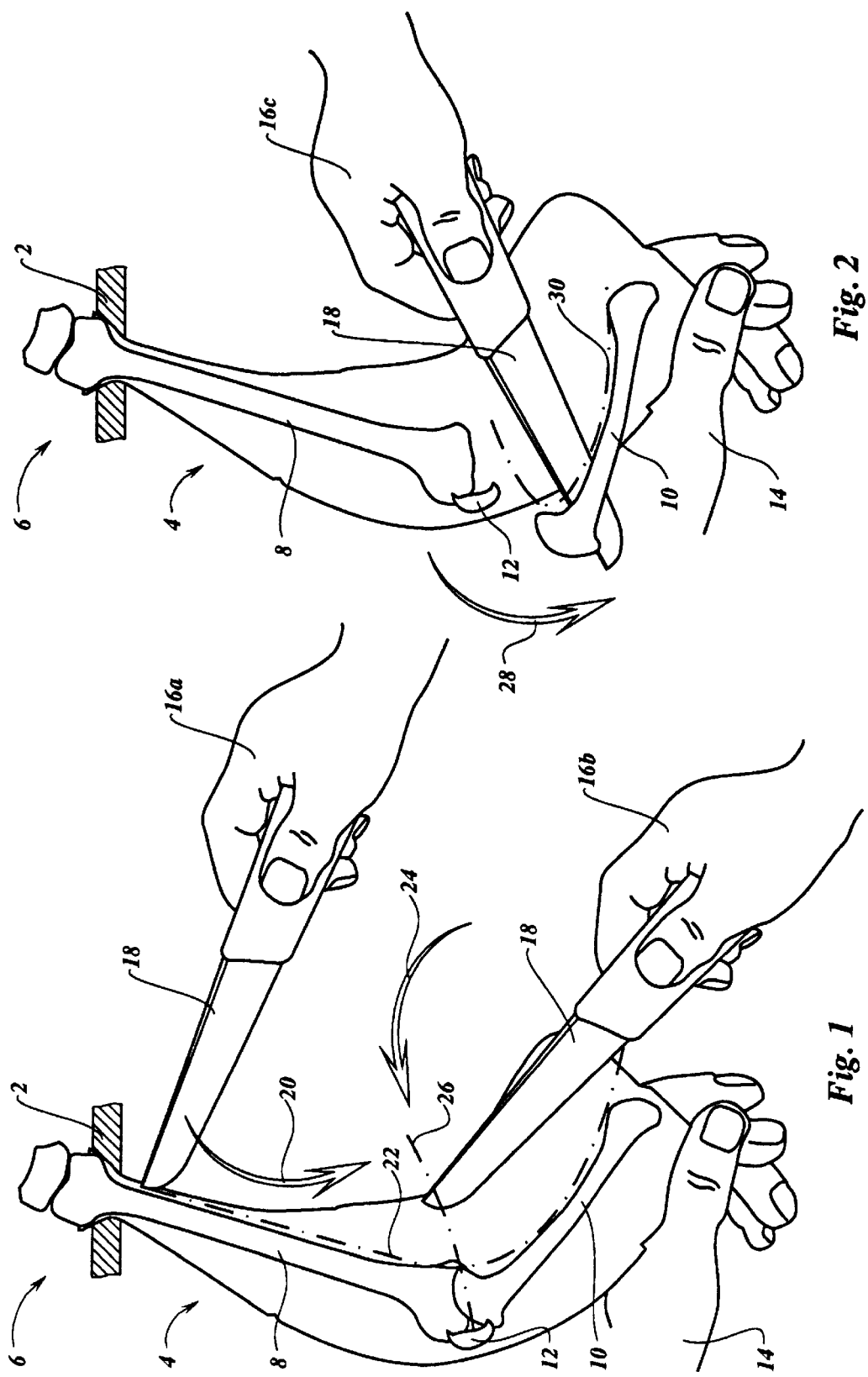

METHOD AND DEVICE FOR BONING A LEG

This application claims priority under 35 U.S.C. §119 to Dutch Application No. 1001226 filed in The Netherlands Patent Office on Sep. 18, 1995.

BACKGROUND OF THE INVENTION

The invention relates to a method and device for boning a leg or lower leg of a slaughtered animal. Such an animal is in particular a bird, such as a chicken, a turkey, a duck, an ostrich or the like, but it can also be other large or small livestock or game, such as a cow, a pig, a horse, a deer, a rabbit etc. When reference is made below to "upper" or "lower" in connection with a leg, "upper" will be understood as meaning: in the direction of the hip joint or at the hip joint side of the leg, and "lower" will be understood as meaning: in the direction of the (possibly imaginary) toes or at the (possibly imaginary) toes side of the leg.

DESCRIPTION OF THE PRIOR ART

Legs of slaughtered animals can be boned in various ways before or after being cut away from the body of the animal. Of relevance in the context of this invention, on the one hand, are methods and devices for use where initially both the lower leg (the part of the leg below the knee joint, known as the drumstick in birds) and the upper leg (the part of the leg above the knee joint, that is the thigh) form part of the leg, which lower leg and upper leg are connected to each other in the knee joint. Of relevance in the context of this invention, on the other hand, are methods and devices by means of which operations are carried out on a lower leg which has already been separated from the corresponding upper leg.

The relevant prior art in the context of the present invention is demonstrated first of all in U.S. Pat. No. 5,176,562, which discloses a device for carrying out a number of mechanized operations for boning a whole leg of a bird. In order to prepare for the boning, a longitudinal cut is made by hand along the leg bone (thigh bone and drumstick bone) on the inside (i.e. the side of the leg which in the natural position faces the corresponding other leg) thereof; a transverse cut is also made by hand at the knee joint, for partially severing the tendons there. Other tendons are then severed mechanically at the knee joint, and the thigh bone is pulled out of the meat mechanically. After an incision has been made at the ankle joint, the drumstick meat is scraped away from the leg in the direction of the knee joint. During the mechanical, automated operations, the drumstick bone is directed essentially horizontally and clamped at two points near the ankle joint.

Another relevant publication is EP-A-0,594,934, in which the mechanical boning of a bird leg, comprising the thigh and the drumstick, is described. For this purpose, the leg is conveyed past a number of processing stations, the lengthwise direction of the leg being essentially at right angles to the direction of conveyance of the leg. In the device the thigh bone is separated from the drumstick bone at the knee joint and ploughed away from the thigh meat of the moving leg. The thigh bone still remains connected to the thigh meat at the position of the hip joint. Using a so-called peeling machine, the drumstick bone meat is peeled away from the ankle joint to the knee joint. Prior to that, an incision is made around the ankle joint, more particularly in the thick part at the ankle end of the drumstick bone.

A drawback of the known methods and devices is that tendon incisions made above the ankle joint result in that the drumstick meat obtained in this way does not look very attractive. This is because the drumstick meat running down from the knee joint and above the ankle joint passes into various tendons which run towards the ankle joint and, once severed, fan out in such a way that in the trade this is known as the undesirable "flower" effect.

Another drawback of known methods and devices is the risk of the drumstick ankle joint part breaking off from the drumstick bone (shin bone) when forces directed away from the ankle joint are exerted on the shin bone, such forces occurring, for example, when the meat is being stripped away from the drumstick bone while the ankle joint is retained by means of a fixing device or suspension. This risk is increased even further by the incision made in the tendons at the ankle joint, in which case the incision can extend into the bone of the lower leg and thus forms the start of a fracture.

Another drawback of known methods and devices is that the knee joint remains behind in the meat obtained and still has to be removed from it by hand, which is undesirable from the point of view of cost and hygiene.

SUMMARY OF THE INVENTION

The object of the invention is to eliminate the above mentioned problems, and to this end the invention firstly provides a method for boning a leg or a part thereof of a slaughtered animal, in particular a bird, by—combined with processing steps already known from the prior art—making at least one tendon incision near the ankle joint and then removing the meat from the leg or the part thereof, which method is characterized in that the tendon incision is made through a tendon at the position of the condyle of the tibia. The tendons which produce the flower effect in the prior art come together in the Achilles tendon of the leg. Cutting into the Achilles tendon therefore means that the tendons remain interconnected, and the flower effect does not occur. Greatly improved presentation of the leg meat obtained is achieved in this way.

An advantageous tendon incision near the condyle of the tibia is a tendon incision at the front of the leg or the part thereof. The defined separation produced by this leads to a more attractive appearance of the meat to be scraped off, and during the scraping the forces exerted upon the ankle joint by which the leg or the part thereof is normally suspended are not as great.

At least the leg or a part thereof is preferably suspended by the ankle joint prior to the boning operation, and the leg or the part thereof is then clamped in the transverse direction thereof, in particular below the ankle joint, relative to the suspension, following which the tendon incision is made. This measure ensures that the intended incision point and incision depth can be predetermined, and the incision can therefore be carried out fully automatically by means of a device.

Such a device for boning at least a leg or a part thereof of a slaughtered animal, in particular a bird, comprises suspension means for carrying at least the leg or the part thereof by the ankle joint, and means for removing the meat from the leg or the part thereof. According to the invention, the device is characterized in that the suspension means comprise a suspension opening which has smaller dimensions than the condyle of the tibia, and in that provision is made for cutting means which are adapted for making a tendon incision above the suspension opening of the suspension means. In this way, the tendon incision can be made at such a point that the flower effect is avoided.

In a preferred embodiment, the suspension means are in the form of a plate which is provided with one or more suspension openings in the form of notches running at right angles to the edge of the plate, which notches are designed to accommodate the shin bone of the leg or the part thereof above the ankle joint. Clamping means, which form part of the machine, for clamping the leg or lower leg in the transverse direction relative to the suspension means, comprise one or more stops which are at least partially movable relative to the plate. Cutting means, which form part of the machine, for making a tendon incision, operate above the plate. The device described above lends itself particularly well to a carousel design.

In a preferred embodiment, the clamping means operate above the plate. This produces fixing by a part of the leg lying outside the fleshy area thereof, so that there is no risk of the meat being damaged and of its quality being reduced.

In another preferred embodiment, a cutting element operates below the plate, in order to make a tendon incision at the front of the leg or the part thereof.

Combined with the method and device according to the invention mentioned earlier, or entirely separately therefrom, the invention provides a device for processing a leg or a part thereof of a slaughtered animal, in particular a bird, having suspension means for carrying at least the leg or the part thereof by the ankle joint, and means for processing the leg or the part thereof, which device is characterized in that the suspension means comprise an interacting lug and stop, which lug, which is movable to and fro preferably in a direction essentially at right angles to the lower leg, is adapted for engaging in the canalis tendineus of the lower leg, and which stop is adapted for supporting the lower leg at the opposite side. This means that, during the scraping of the meat from the leg and the operations connected therewith, the forces on the lower leg directed away from the ankle joint can be absorbed much better than in the case of fixing or suspension at the position of the ankle joint part, and the risk of the joint part breaking off is consequently considerably reduced. Moreover, the use of the lug increases the stability of the fixing of the bone concerned, so that the tendons are positioned more accurately and can consequently be cut with greater accuracy.

Combined with the tendon incision according to the invention or the use of the lug in the canalis tendineus according to the invention, or entirely separately therefrom, the invention provides a method and device for removal of the kneecap from the leg of a slaughtered animal, in particular a bird, which method is characterized in that the kneecap, which is connected at least to a part of the leg, is pressed into and through an opening of a stop element, and the remainder of the leg cannot pass through the opening, following which the kneecap projecting from the opening is removed. A device for carrying out this method comprises supporting means for supporting at least a part of the leg connected to the kneecap, a stop element which can be placed against the leg at the level of the knee joint and comprises an opening through which the kneecap can pass and the remainder of the leg cannot pass, and a kneecap removing means for separating the leg's kneecap projecting from the opening. This method and device make it possible to remove the kneecap entirely mechanically prior to or during the boning of the leg, so that the kneecap need no longer be removed by hand from the meat obtained.

In a preferred embodiment of the device according to the invention described above, the stop element comprises a plate, while a cutting element is disposed at the side of the plate where the kneecap is intended to project, in such a way that it is movable along the surface of the plate and operates in the direction of the surface, for cutting the kneecap away from the leg.

Combined with the tendon incision according to the invention or the use of the lug in the canalis tendineus according to the invention, or entirely separately therefrom, the invention provides a method and device for removal of the kneecap from the leg of a slaughtered animal, in particular a bird, said leg comprising at least an upper leg and a lower leg, in which the upper leg bone or the lower leg bone is first removed from the leg, which method is characterized in that the bone remaining behind in the leg is then acted upon in order to take the knee joint into a predetermined position at a predetermined point, following which the kneecap is separated from the leg.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 1 shows a side view of a leg of a bird suspended from a carrier, in order to illustrate a number of preparatory operations for the boning thereof;

FIG. 2 shows the view according to FIG. 1 in a subsequent phase of the boning operation.

DESCRIPTION OF THE PREFERRED EMBODIMENTS

Figures 3, 4, 5:
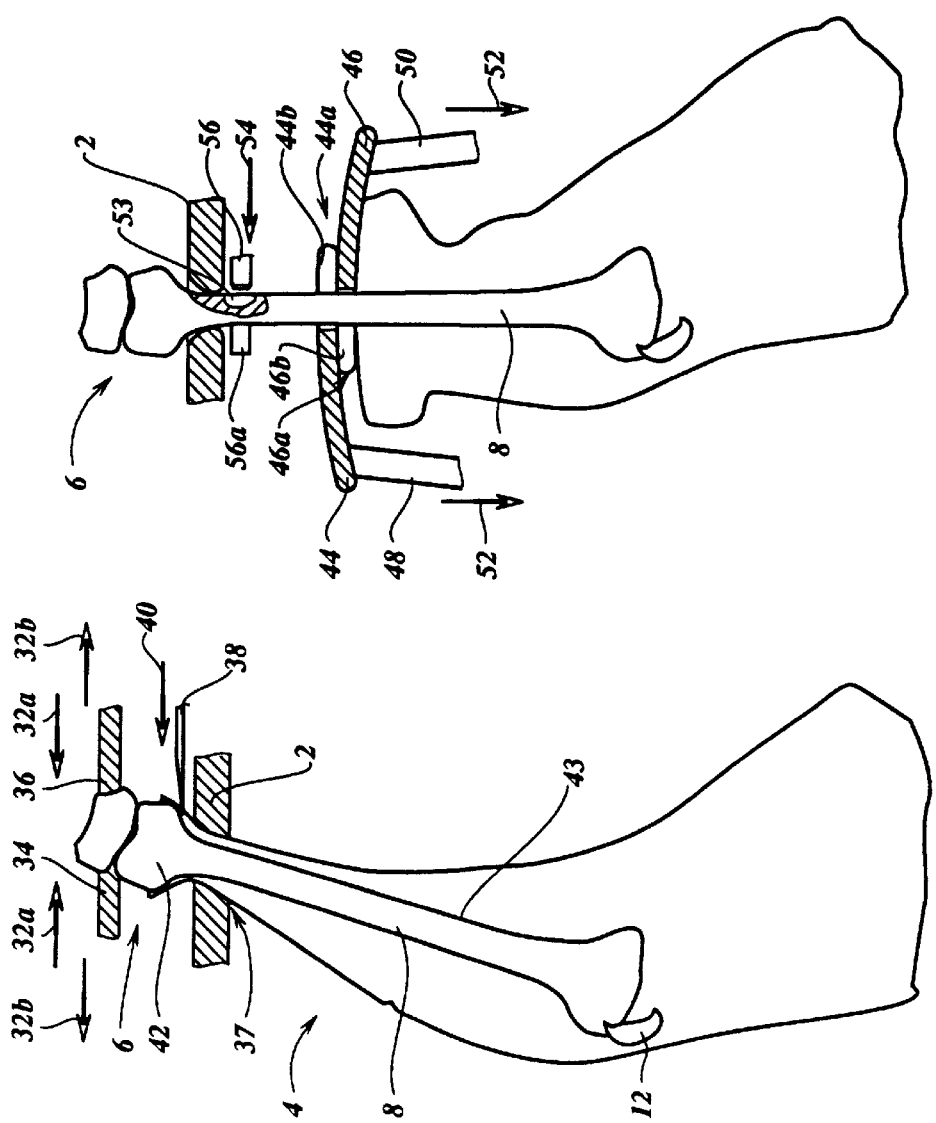
FIGS. 3–6 illustrate subsequent phases of the boning operation.

FIG. 1 shows a carrier 2 with an aperture in which a leg 4 of a bird is suspended by its ankle joint 6. Although in the description which follows operations are explained with reference to a bird leg, it will be clear that similar operations can also be carried out on legs of other animals, such as those mentioned in the preamble of the description. The carrier 2 can be formed by a plate or an essentially plate-shaped element, along the edge of which one or more apertures are made for the accommodation of the shin bone of one or more respective legs, but the carrier can also be formed as, for example, a hook which is moved along continuously or intermittently in a conveyor line. In the leg, the lower leg bone or drumstick bone 8, the upper leg bone or thigh bone 10 and the kneecap 12 are shown diagrammatically.

Two preparatory cutting operations are being carried out on the leg 4 in FIG. 1, in which a left hand 14 of a person is holding the leg 4 by its underside, while the right hand makes the incisions from positions 16a, 16b by means of a knife 18. A first incision is made from the position of the right hand indicated by 16a, in the direction of arrow 20 along dashed-and-dotted line 22 up to the region of the hip joint of the thigh bone 10. A second incision is made from the position of the right hand indicated by 16b, in the direction of arrow 24 along dashed-and-dotted line 26 through the knee joint up to the kneecap 12 thereof.

FIG. 2 illustrates how the thigh bone 10 is then removed from the upper leg following the cut along the dashed-and-dotted line 26, by moving the knife 18 with the right hand 16c in the direction of arrow 28 along a path indicated by dashed-and-dotted line 30.

The operations described above with reference to FIGS. 1 and 2 are not essential for the present invention, and could be omitted, if desired, if use is made of a suitable method or device for removal of the meat from both the lower leg and the upper leg, in which case the knee joint remains intact, as described in, for example, publication NL-A-9301238.

Besides, a manual operation is shown in FIGS. 1 and 2 purely for reasons of clarity. Some or all of these operations can also be carried out mechanically, as described in the earlier mentioned publications U.S. Pat. No. 5,176,562 and EP-A-0,594,934.

It will also be clear that, instead of a whole leg, it is also possible to start from a part of the leg, such as the drumstick, for the operations to be described below.

In the phase of the boning of the leg 4 illustrated in FIG. 3, the ankle joint 6 is clamped in the transverse direction above the carrier 2 by means of stops 34 and 36 which are movable relative to the carrier 2 in the directions of the arrows 32a and 32b. The cutting side of a knife 38 is then inserted into the ankle joint 6 in the direction of arrow 40, in order to sever the Achilles tendon at the back of the leg 4 at the position of the condyle 42 of the tibia 43, for the purpose of preventing the flower effect. Any incision made near the condyle at the front of the leg or the part thereof is made at the point indicated by 37.

FIG. 4 illustrates how the meat is scraped from the bone 8 of the lower leg after the Achilles tendon incision shown in FIG. 3 has been made. For this purpose, a pair of scraper plates 44 and 46, each of which is provided with an aperture 44b and 46b at a front edge 44a and 46a respectively, are partially overlapped, so that a scraping opening is produced, as is usual in the art for scraping meat from the leg of a bird. The scraper plates 44 and 46 can be moved both towards and away from each other by means of arms 48 and 50 respectively fixed thereto, the movements of which arms are produced by, for example, curved path control. The scraper plates 44 and 46 in the mutual position shown in FIG. 4 are moved in the direction of arrows 52 from a position directly below the carrier 2 to an end position which is shown in FIG. 5.

As soon as the scraper plates 44 and 46 shown in FIG. 4 have left their initial position directly below the carrier 2 and have passed the canalis tendineus 53 of the lower leg bone, a lug 56 is placed from one side in the direction of arrow 54 in the canalis tendineus 53, and stop 56a is placed against the bone in the opposite direction, in a manner not shown in any further detail, for stabilization of the bone, and for absorbing the scraping forces exerted on the bone 8 by the scraper plates 44 and 46, in order to prevent the bone 8 from breaking off near the ankle joint 6.

When the scraper plates 44 and 46 have reached their end position shown in FIG. 5, said plates and the lug 56 are withdrawn from the leg.

Figure 6:
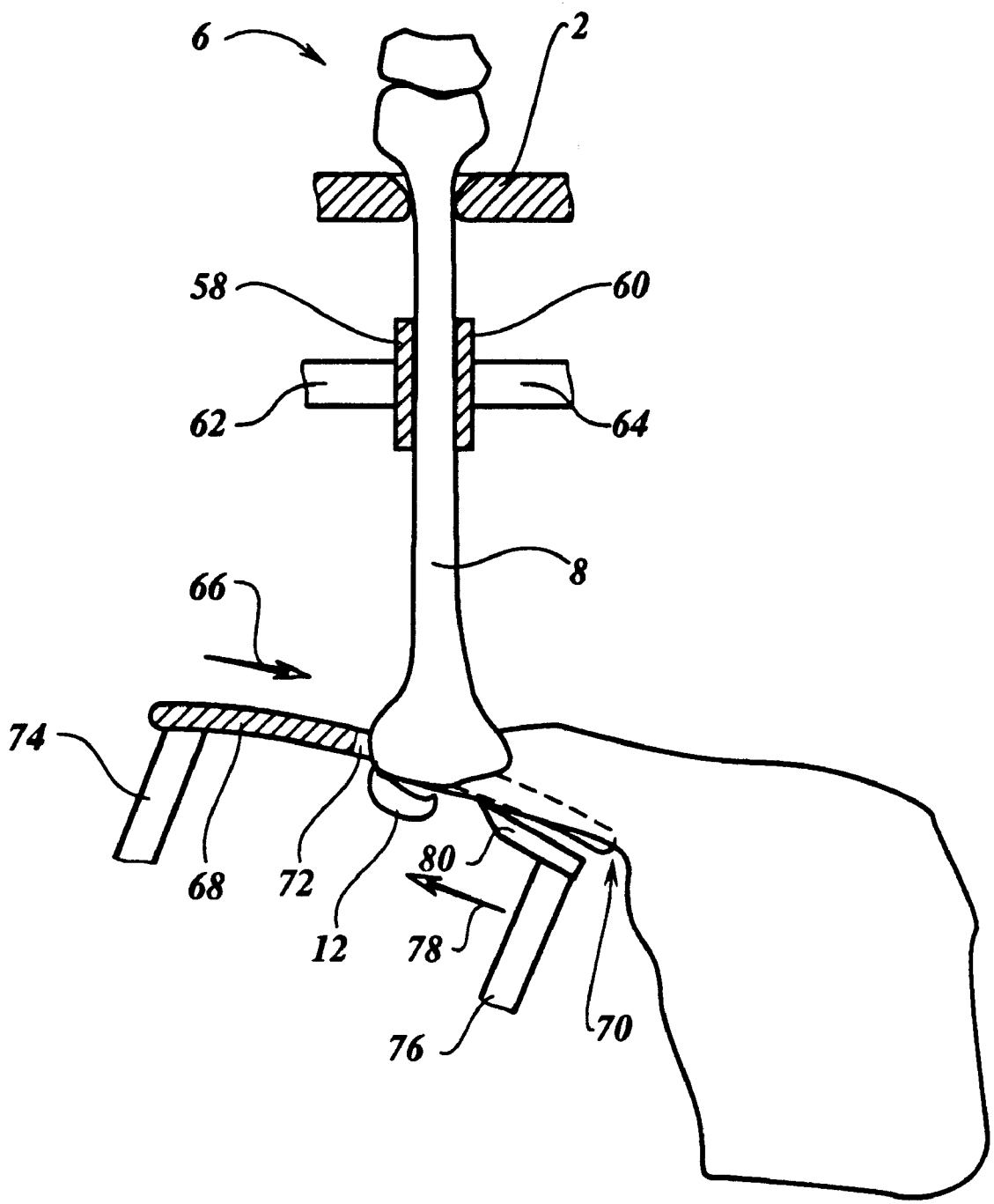

FIG. 6 illustrates the operation of removal of the kneecap 12 from the leg, in order to prevent it from going into the leg meat and subsequently having to be removed therefrom by hand. The lower leg bone 8 is fixed by means of one or more, in this case two, stops 58 and 60 which are fitted on arms 62 and 64 respectively, for moving the stops 58 and 60 relative to the bone 8. A plate 68, which is provided with an aperture 72 at the front side 70 thereof, is pressed against the knee joint in the direction of arrow 66 by means of a movable arm 74, in which case the kneecap 12 can pass through the aperture 72, but the knee joint part of the bone 8 cannot pass through the aperture 72. The plate 68 pushes the lower leg bone 8 upwards slightly into the opening of the carrier 2, with the result that a length difference compensation for bones of different lengths is obtained. The meat hanging down is pushed to the side here, possibly by means of additional means which are not shown. The kneecap 12 therefore ultimately projects below the plate 68. A knife 80 which is movable on an arm 76 in the direction of arrow 78 is then moved with its cutting side along the surface of the plate 68, and in the process cuts the kneecap 12 away from the leg. After the plate 68 and the knife 80 are withdrawn, the meat hanging at the bottom end of the bone 8 can be removed from the bone 8 by hand or mechanically.

It is also possible not to make the transverse cut shown in FIG. 1, and not to remove the thigh bone until after the meat has been scraped from the whole leg. Here again, the situation shown in FIG. 6 will then ultimately be reached.

While the invention has been described and illustrated in its preferred embodiments, it should be understood that departures may be made therefrom within the scope of the invention, which is not limited to the details disclosed herein.

What is claimed is:

1. A method for boning a leg or a part thereof of a slaughtered animal, in particular a bird, comprising the steps of: suspending the leg or a part thereof by a tibia; fixing the leg or the part thereof in a position below the knee joint in a direction transverse to a longitudinal axis extending between the ends of the tibia, relative to a point of suspension of the tibia; and making at least one tendon incision near the position of a condyle of the tibia and then removing the meat from the leg or the part thereof, wherein the tendon incision is made through a tendon near the ankle joint.

2. The method according to claim 1, wherein the tendon incision is made in the Achilles tendon.

3. The method according to claim 1, further comprising the step of making a second tendon incision near the condyle of the tibia at the front of the leg or the part thereof.

4. The method according to claim 1, wherein the leg or a part thereof is suspended by the ankle joint.

5. The method according to claim 1 wherein the leg or a part thereof is clamped in a direction transverse to a longitudinal axis extending between the ends of the tibia, relative to the suspension.

6. The method according to claim 5, wherein the step of clamping the leg or a part thereof includes a step of moving a stop into engagement with the leg or a part thereof.

7. The method according to claim 5, wherein the leg or a part thereof is clamped below the ankle joint.

8. The method according to claim 1, wherein the tendon incision is made through a tendon at the position of the condyle of the tibia.

9. A device for boning a leg or at least a part thereof of a slaughtered animal, the device comprising suspension means for carrying at least the leg or the part thereof by a tibia; fixing means for fixing the leg or the part thereof in a position below the knee joint in a direction transverse to a longitudinal axis extending between the ends of the tibia, relative to the suspension means; and means for removing the meat from the leg or the part thereof, wherein the suspension means includes a suspension opening which has smaller dimensions than the condyle of the tibia, and wherein cutting means adapted for making a tendon incision above the suspension opening of the suspension means are provided.

10. The device according to claim 9, wherein the suspension means is in the form of a plate which is provided with one or more suspension openings in the form of notches running at right angles to the edge of the plate, which notches are designed to accommodate the shin bone of the leg or the part thereof above the ankle joint; in that the clamping means comprises one or more stops which are at least partially movable relative to the plate; and in that the cutting means operates above the plate.

11. The device according to claim 10 wherein the clamping means operates above the plate.

12. The device according to claim 10 or 11, further comprising a cutting element constructed and arranged to operate below the plate for making a tendon incision at the front of the leg or the part thereof.

13. The device according to claim 9, wherein the fixing means are clamping means for clamping the leg or a part thereof.

14. A device for processing a leg or a part thereof of a slaughtered animal, in particular a bird, having suspension means for carrying at least the leg or the part thereof by the ankle joint, and means for processing the leg or the part thereof, wherein the suspension means comprise an interacting lug and stop, which lug is adapted for engaging in the canalis tendineus of the lower leg, and which stop is adapted for supporting the lower leg at the opposite side.

15. A device according to claim 14, wherein the lug is movable to and fro in a direction essentially at right angles to the lower leg.

16. A method for removing the kneecap from a leg of a slaughtered animal, in particular a bird, prior to or during the boning of the leg, the method comprising the steps of: passing the kneecap into an opening of a stop element, the opening being sized and shaped to prohibit passage of the bone therethrough; and moving a separating device alone the stop element between the kneecap and the bone to separate the kneecap therefrom.

17. A device for removing the kneecap from the leg of a slaughtered animal, in particular a bird, prior to or during the boning of the leg, the device comprising: support means for supporting at least a part of the leg connected to the kneecap; a stop element defining an opening into which the kneecap is passed, and a kneecap removing means for removing the leg's kneecap.

18. The device according to claim 17, wherein the stop element comprises a plate having an opening through which the kneecap is passed, and wherein the kneecap removing means comprises a cutting element disposed at the side of the plate where the kneecap is intended to project, which cutting element is movable along the surface of the plate and operates in the direction of the surface, for cutting the kneecap away from the leg.

19. A method for removal of the kneecap from a leg of a slaughtered animal, in particular a bird, said leg comprising at least an upper leg and a lower leg, in which the upper leg bone or the lower leg bone is first removed from the leg, wherein the bone remaining behind in the leg is then acted upon in order to take the knee joint into a predetermined position at a predetermined point, following which the kneecap is separated from the leg.

20. A device for removal of the kneecap from a leg of a slaughtered animal, in particular a bird, said leg comprising at least an upper leg and a lower leg, having means for removing the upper leg bone or the lower leg bone from the leg, comprising means for positioning the bone remaining behind in the leg, and means for separating the kneecap from the leg.

* * * * *